United States Patent
Sato

(10) Patent No.: US 8,274,511 B2
(45) Date of Patent: Sep. 25, 2012

(54) APPARATUS FOR DISPLAYING WIRING

(75) Inventor: Yasushi Sato, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 681 days.

(21) Appl. No.: 12/285,933

(22) Filed: Oct. 16, 2008

(65) Prior Publication Data

US 2009/0146997 A1    Jun. 11, 2009

(30) Foreign Application Priority Data

Oct. 23, 2007 (JP) ................. 2007-274754
Oct. 23, 2007 (JP) ................. 2007-274798

(51) Int. Cl.
*G06T 17/00* (2006.01)
*G06T 15/00* (2006.01)
*G06F 19/00* (2006.01)

(52) U.S. Cl. .................... 345/420; 345/619; 700/97
(58) Field of Classification Search ............... None
See application file for complete search history.

(56) References Cited

U.S. PATENT DOCUMENTS 5,506,950 A * 4/1996 Hughes et al. .............. 345/420
6,970,755 B2 * 11/2005 Sakakura et al. ............ 700/97
2006/0214947 A1 * 9/2006 Boose et al. ................ 345/619

FOREIGN PATENT DOCUMENTS

JP    2005-004726    1/2005

* cited by examiner

*Primary Examiner* — Daniel Washburn
*Assistant Examiner* — Donna Ricks
(74) *Attorney, Agent, or Firm* — Squire Sanders (US) LLP

(57) ABSTRACT

The present invention provides an apparatus which displays a plan wiring diagram and three-dimensional layout diagram by associating them with each other so that they can be viewed easily. An apparatus for displaying wiring includes a first storage for storing an image of a plan wiring diagram which shows parts and wirings and a second storage for storing a three-dimensional layout of an apparatus which incorporates the parts and the wirings, and a third storage for storing intermediate images transitional between a starting image in the plan wiring diagram and an ending image of a shape of the corresponding wiring in the three-dimensional layout. A processor displays the plan wiring diagram on the display device by retrieving the plan wiring diagram from the first storage based on a user's selection, and retrieves the intermediate images of a wiring from the third storage when the wiring is selected from the plan wiring diagram and displays transitions to the shape shown in the three-dimensional layout.

13 Claims, 7 Drawing Sheets

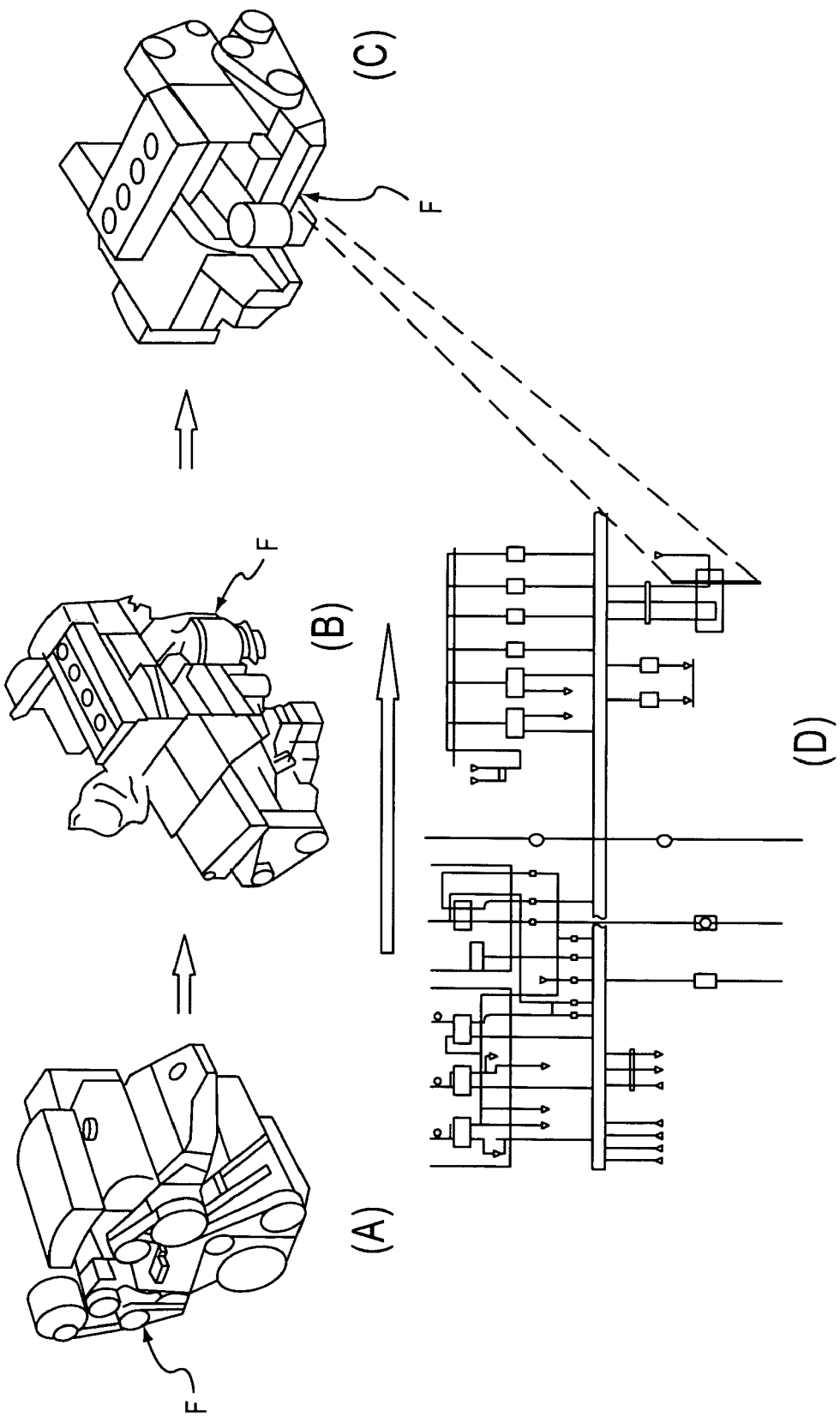

APPARATUS FOR DISPLAYING WIRING

BACKGROUND OF THE INVENTION

1. Field of the Invention

The present invention relates to an apparatus for displaying wiring which can graphically display correspondence between a plan wiring diagram of an electric circuit and a geographical layout diagram which represents layout of wirings in an actual machine or apparatus.

2. Description of the Related Art

Instruction manuals such as automotive service manuals contain a plan wiring diagram showing an electrical system and a three-dimensional layout diagram showing a geographical layout of wirings in illustrations of an automobile. Both manuals are referred to during servicing of the automobile.

Recently, plan wiring diagrams and geographical layout diagrams have become very complicated leading to a practice of referring to a service manual on a display screen. The service manual is converted into an electronic form. In a service manual in electronic form, a wiring diagram and a circuit board with electronic components mounted are displayed together in a split display screen or a position in the layout diagram corresponding to a position selected by a user in the plan wiring diagram is displayed in a different color, for example, as shown in Japanese Patent Application Publication No. 2005-4726.

However, plan wiring diagrams represent electrical relationships among components of an electrical system while three-dimensional layout diagrams represent relationships between positions and wirings of parts. The two types of diagram differ completely in the form of expression. It is difficult to watch the two diagrams alternately by shifting one's line of sight and understand the correspondence between the two diagrams.

In automobiles, wirings are often bundled into a wiring harness. Difficulty is also encountered in finding out where the plurality of wirings contained in the harness is located in a plan wiring diagram. Further, a single wiring connector or a single electrical component with multiple functions may be split into multiple portions and is displayed at multiple locations in a plan wiring diagram. This makes it difficult to recognize the wiring connector or electrical component. When similar parts are placed in a concentrated manner such as when a plurality of electronic control units (ECU) are placed in layers, it is not easy to distinguish the parts.

SUMMARY OF THE INVENTION

An object of the present invention is to provide an apparatus which can display a plan wiring diagram and three-dimensional layout diagram by associating them with each other so that they can be viewed easily.

To achieve the above object, the present invention provides an apparatus for displaying wiring. The apparatus comprises a first storage adapted to store an image of a plan wiring diagram which shows parts and wirings, a second storage adapted to store a three-dimensional layout diagram of an apparatus which incorporates the parts and the wirings, and a third storage adapted to store intermediate images which are transitional between a starting image and an ending image. Each of the wirings shown in the plan wiring diagram is a starting image and the shape of a corresponding wiring in the three-dimensional layout diagram is an ending image.

The apparatus further comprises a processor adapted to display images on a display device. The processor displays the plan wiring diagram on the display device by retrieving the plan wiring diagram from the first storage based on user's selection, and retrieves intermediate images of a wiring from the third storage when the wiring is selected from the plan wiring diagram and displays continuous transition until the wiring is illustrated by a shape in the three-dimensional layout diagram.

Since continuous transition of the wiring the user selected from the plan wiring diagram is displayed until the wiring takes the three-dimensional shape in the three-dimensional layout diagram, the present invention can make it easy for the user to recognize correspondence between the plan wiring diagram and three-dimensional layout diagram.

According to one aspect of the present invention, the apparatus for displaying wiring further comprises a forth storage adapted to store positions and shapes of the parts in the plan wiring diagram in association with three-dimensional positions and three-dimensional shapes of the parts in the three-dimensional layout diagram. The processor displays the plan wiring diagram on the display device by retrieving the plan wiring diagram from the first storage based on a user's selection, and retrieves the three-dimensional position and three-dimensional shape of a part from the fourth storage when the part is selected from the plan wiring diagram for displaying the part superimposed over the three-dimensional layout diagram.

According to the present invention, since the three-dimensional shape of the part selected from the plan wiring diagram by the user is retrieved and superimposed over the three-dimensional layout diagram. Thus, the user may recognize correspondence between the plan wiring diagram and three-dimensional layout diagram.

According to an embodiment of the present invention, the plan wiring diagram is formed superimposing on a general underlying drawing of the wirings layers of the respective wirings. Intermediate images are provided for each layer.

According to another embodiment of the present invention, the intermediate images are generated by morphing.

According to another embodiment of the present invention, while displaying the intermediate images of the selected wiring, the processor erases the general underlying drawing of the wirings and retrieves and gradually displays a general underlying drawing of a corresponding three-dimensional layout on the display.

According to another form of the present invention, an apparatus for displaying wiring comprises a first storage adapted to store an image of a plan wiring diagram which shows parts and wirings, a second storage adapted to store a three-dimensional layout diagram of an apparatus which incorporates the parts and the wirings, and a third storage adapted to store intermediate images transitional between a starting image and an ending image. The three-dimensional layout diagram is the starting image and the plan wiring diagram is the ending image.

The apparatus includes a processor adapted to display images on a display device. The processor displays the three-dimensional layout diagram on the display device by retrieving the three-dimensional layout diagram from the second storage based on a user's selection, and retrieves the intermediate images of a wiring from the third storage when the wiring is selected from the three-dimensional layout diagram. Continuous transition is displayed until the wire Appears in the plan wiring diagram.

Since transition of the wiring selected from the three-dimensional layout diagram by the user is displayed until the wire Assumes the shape and position in the plan wiring diagram, the user may recognize correspondence between the three-dimensional layout diagram and plan wiring diagram.

According to an embodiment of the present invention, the apparatus for displaying wiring further comprises a forth storage adapted to store positions and shapes of the parts in the plan wiring diagram in association with three-dimensional positions and shapes of the parts in the three-dimensional layout diagram. The processor displays the three-dimensional layout diagram on the display device by retrieving the three-dimensional layout diagram from the second storage based on a user's selection. The processor retrieves the position and shape of a part in the plan wiring diagram from the fourth storage when the part is selected from the three-dimensional layout diagram and displays the part at a corresponding position in the plan wiring diagram.

According to this embodiment, since the part selected from the three-dimensional layout diagram by the user is displayed at the position and in the shape of the part in the plan wiring diagram, the user may recognize correspondence between the three-dimensional layout diagram and plan wiring diagram.

According to another embodiment of the present invention, the three-dimensional layout diagram is formed of superimposition of a general underlying drawing of a three-dimensional layout and layers of individual wirings. The intermediate images are provided for each layer.

According to another embodiment of the present invention, the plan wiring diagram is formed of superimposition of a general underlying drawing of the wirings and layers of the respective wirings.

According to another embodiment of the present invention, the intermediate images represent transitions which take place before a plurality of wires bundled into a harness shown in the three-dimensional layout diagram are displayed as wirings in the plan wiring diagram.

According to another embodiment of the present invention, when the plurality of wires bundled into a harness correspond to a plurality of drawings in the plan wiring diagram, the processor displays identification information about the plurality of drawings. When one of the drawings is selected, the processor displays intermediate images for the selected drawing on the display.

According to another embodiment of the present invention, the intermediate images are generated by morphing.

According to another embodiment of the present invention, while displaying the intermediate images of the selected wiring, the processor erases the general underlying drawing of the three-dimensional layout diagram and gradually displays a general drawing of a plan wiring diagram containing the corresponding wiring on the display.

BRIEF DESCRIPTION OF THE DRAWINGS

FIG. 7 is a diagram showing an example of transitions from a three-dimensional layout diagram to a plan wiring diagram when the transitions involve rotation of the three-dimensional diagram.

DETAILED DESCRIPTION OF THE PREFERRED EMBODIMENTS

Embodiments of the present invention will be described with reference to the drawings. An apparatus for displaying wire According to the present invention is implemented when a computer program created for the present invention is installed on a general purpose computer such as a personal computer. In its basic configuration, the computer includes a processor (CPU), a random access memory (RAM) which provides a working area for the processor and temporarily stores programs and data, a non-volatile storage device such as a disk drive which stores computer programs and data, a display device such as a CRT display and a liquid crystal display for displaying computer output, and input devices such as a keyboard and mouse.

Figure 1:
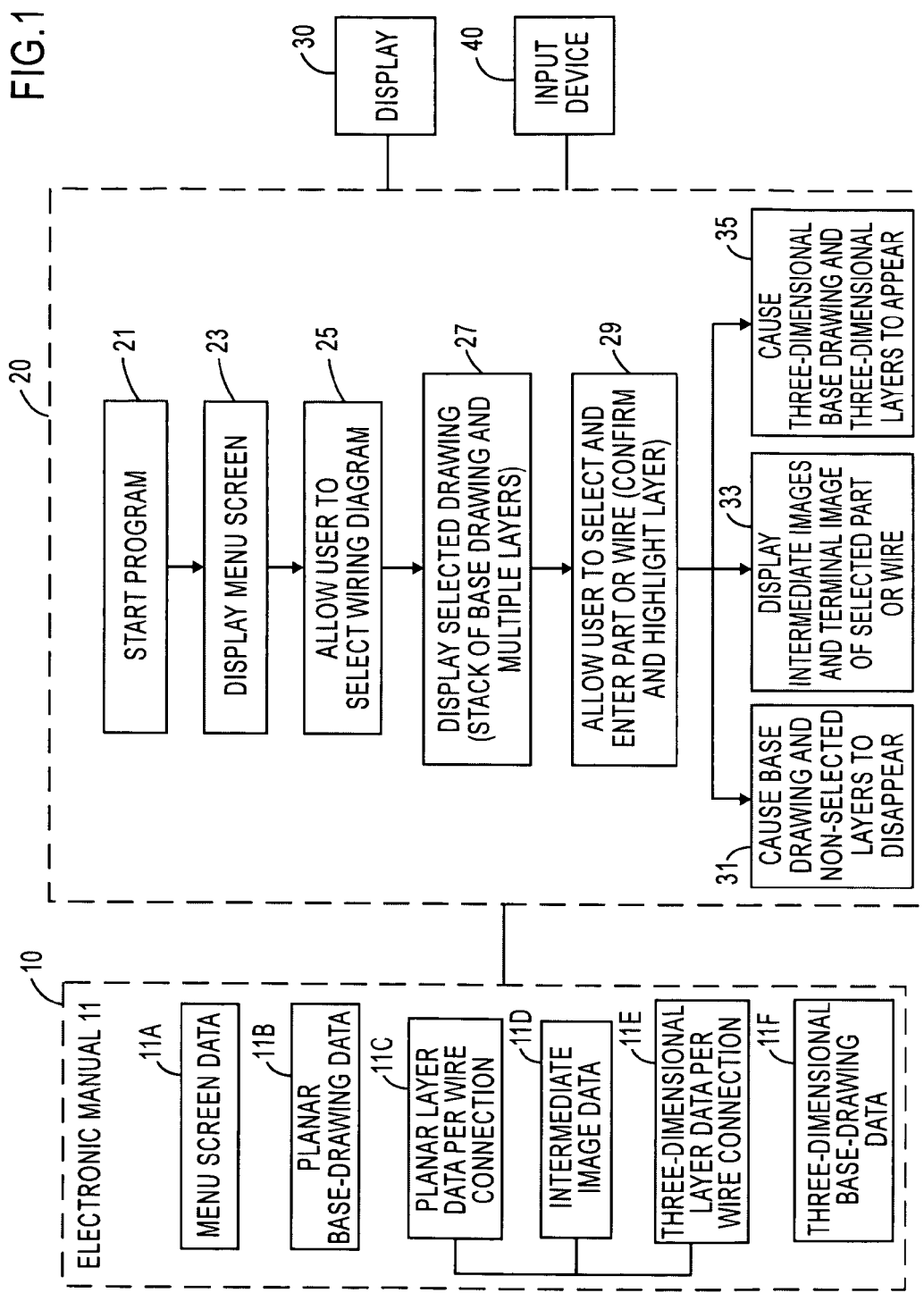
FIG. 1 is a block diagram showing an overall configuration of a apparatus for displaying wire According to the present invention.

FIG. 1 is a block diagram showing an overall configuration of the apparatus for displaying wire According to the present invention. A disk storage device 10 stores an electronic manual 11 for automobile servicing. The electronic manual 11 includes data stored in a menu screen data storage 11A for the electronic manual, underlying-drawing data storage 11B for a plan wiring diagram linked to the menu screen data storage 11A. The manual further includes planar layer data storage 11C for storing planar layers for each wiring, intermediate image data storage 11D for storing intermediate images which represent transitions in wiring shape from the shape in the plan wiring diagram to the shape in a three-dimensional layout diagram and conversely from the three-dimensional shape in the three-dimensional layout diagram to the shape in the plan wiring diagram. The manual also includes data storage 11E for storing three-dimensional layer for each wire and data storage 11F for storing underlying drawing of the three-dimensional layout diagram.

The processor 20 realizes a function of displaying wire According to the present invention with the disk storage device 10, display device 30, and input devices 40. When a user starts the computer of the apparatus and selects the program for the electronic manual, the processor 20 activates the program for the electronic manual (21). Consequently, a menu of the electronic manual is displayed on the display device 30 (23). Since the electronic manual itself is publicly known, detailed description is omitted. When the user selects a fuel injection system (PGM-FI), brake system (ABS), headlight system, or the like and selects a page of a plan wiring diagram (25) in accordance with the menus and using input devices 40 such as the keyboard and mouse, a plan wiring diagram is retrieved and displayed on the display device 30 (27).

Figure 2:
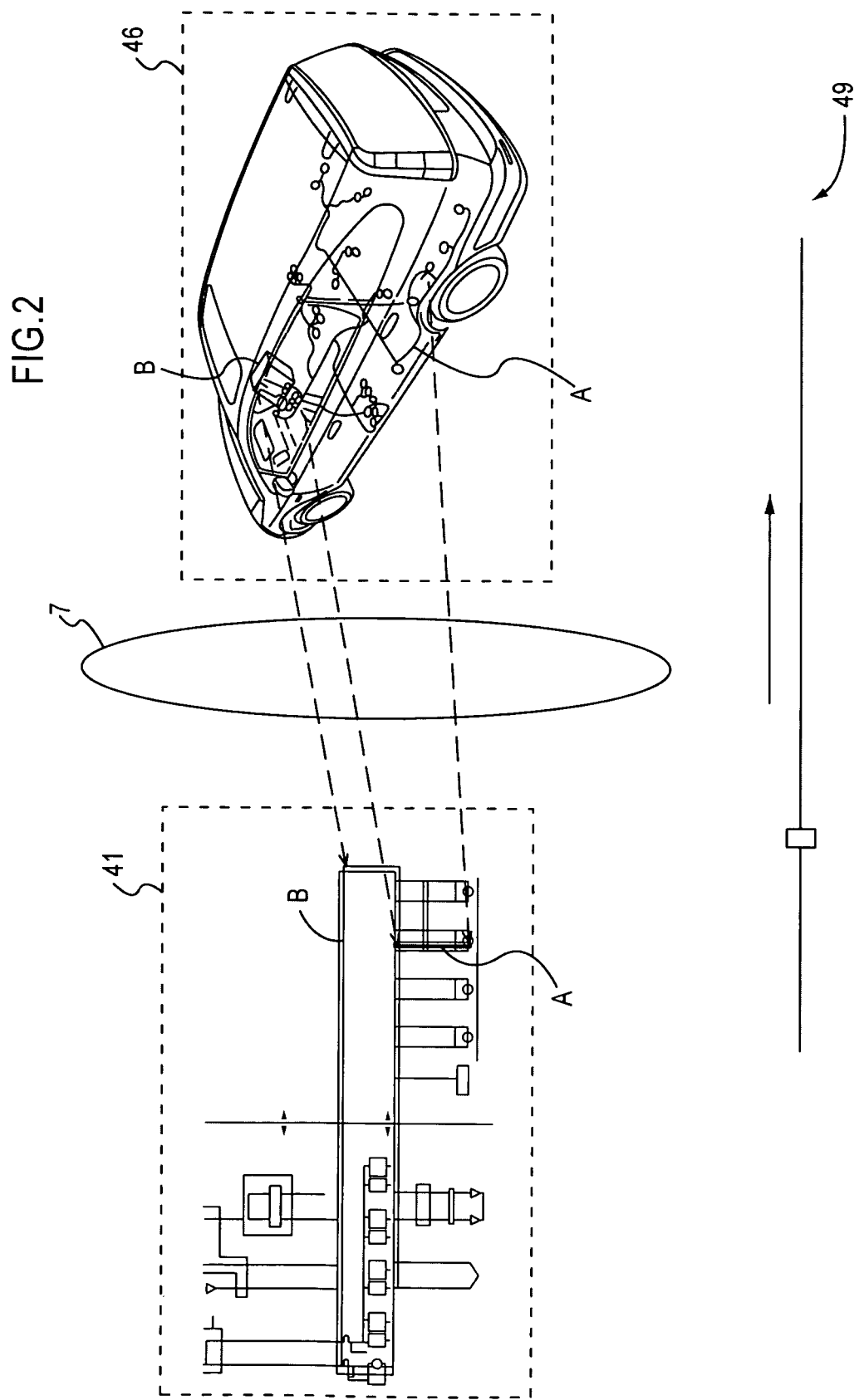
FIG. 2 is a diagram showing how transitions which take place from a plan wiring diagram to a three-dimensional layout diagram.

FIG. 2 is a diagram illustrating how display on the display device 30 changes from a plan view to a three-dimensional view. Block 41 shows an example of a plan view displayed on the display device 30. The plan view is formed by superimposing layers of individual wirings and parts retrieved from the data storage 11C over a underlying layer containing all the wirings, which is retrieved from the data storage 11B in FIG. 1. For example, if the number of wirings and parts is thirty, thirty-one layers consisting of thirty wiring layers plus one underlying layer are superimposed and displayed as a plan view on the display device 30.

If the user selects wire A by placing a cursor on wire A in the plan view and clicking the mouse or entering a part number of wire A via an input device 40 (29), the layer of wire A is superimposed over the underlying drawing of all the wirings. The wire A is highlighted by bold lines or by color. Next, when the user pushes a confirmation button (not shown) displayed on a screen of the display device 30, for example, by clicking the button with a mouse, wire A changes its shape gradually to a three-dimensional shape as shown in block 46 through intermediate images 7 (FIG. 2). The three dimensional shape is superimposed over an underlying drawing of a three-dimensional layout retrieved from data storage 11F storing the three-dimensional underlying drawings.

The speed of transition may be adjusted using a scroll bar 49.

Figure 3:
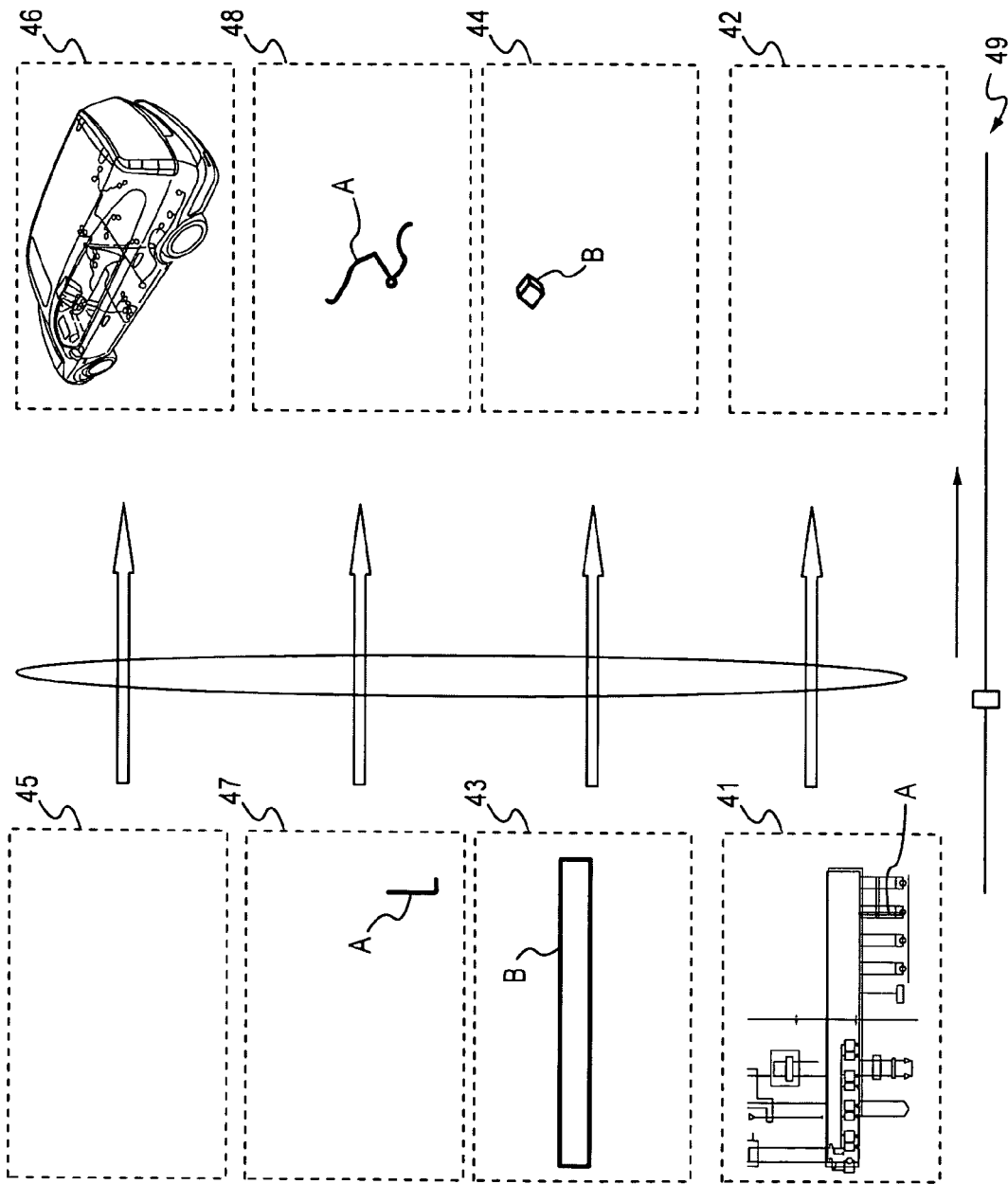
FIG. 3 is a stop-motion diagram showing a mechanism of transitions from a plan wiring diagram to a three-dimensional layout diagram.

FIG. 3 illustrates stop-motion transitions. First, a plan view 41 selected by the user is displayed on the display device 30, which comprises an underlying drawing retrieved from the data storage 11B and superimposed layers of multiple wirings retrieved from data storage 11C. When the user selects wire A from the wiring diagram in the manner described above, a layer 47 of wire A is superimposed over an image 41 of the plan wiring diagram, wire A being highlighted by bold lines or by color. Next, the intermediate images of the layer 47 are retrieved from the intermediate image data storage 11D to represent transitions to a corresponding layer 48 in the three-dimensional layout diagram (33).

In the meantime, the underlying drawing of the three-dimensional layout diagram disappears gradually from a display screen, resulting in a blank image 42 (31). At the same time, an image 46 appears gradually on the display screen with the layer 48 of wire A being superimposed over the underlying drawing of the three-dimensional layout of the automobile retrieved from the storage 11F (35). Then, multiple layers of three-dimensional diagrams of the wirings contained in the underlying drawing are retrieved from the data storage 11E and superimposed over the underlying drawing to complete the image 46 of the three-dimensional layout diagram in which wire A is highlighted (35).

The layer of each wiring is linked to the underlying drawing using a part number and superimposed over the underlying drawing in such a way as to take an appropriate position on the underlying drawing.

The intermediate images used here are generated using a morphing technique. The morphing technique generates moving-image data which represents smooth transitions from a still image to another still image and is used in the field of animation. Morphing software products are commercially available. The morphing technique handles images in GIF, JPEG, TIFF, PNG, and other file formats.

In one example, wire A and part B connected to wire A are selected. When wire A and part B are selected, a layer 43 of part B (e.g., an electronic control unit ECU) and layer 47 of wire A are highlighted. Transition of part B into a three-dimensional layer 44 is represented by intermediate images, which are produced by the morphing technique. The three-dimensional layer 44 of part B is superimposed over the underlying drawing of the three-dimensional layout diagram of the automobile to resulting in the three-dimensional layout diagram 46. In this way, wire A and part B connected to wire A are superimposed over the underlying drawing of the three-dimensional layout diagram.

Figure 5:
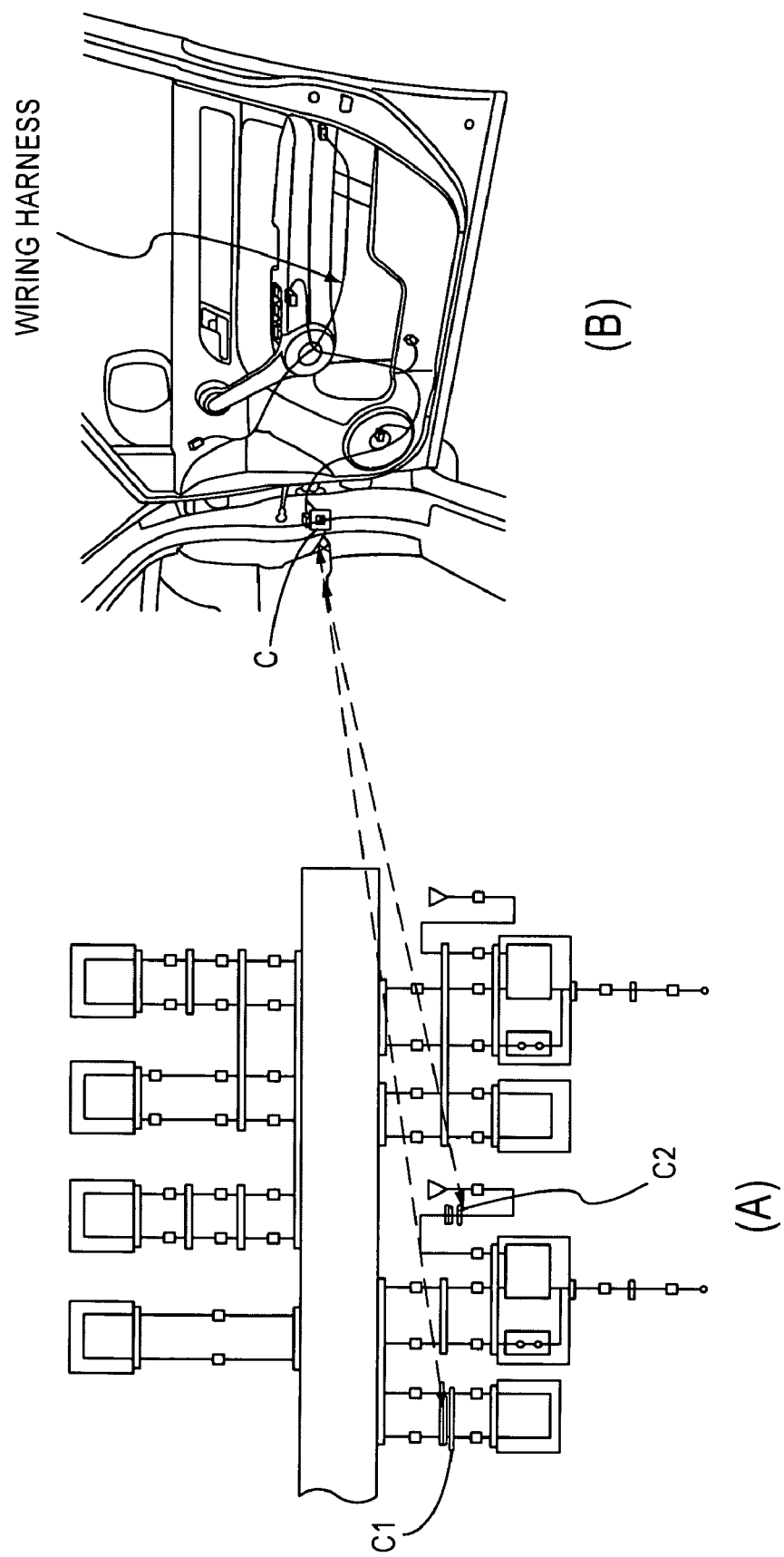
FIG. 5 is a diagram showing a relationship between a plan wiring diagram and three-dimensional layout diagram where a single part is split into two portions in the plan wiring diagram.

FIG. 5 shows an embodiment of one application of the present invention. In a plan wiring diagram, a single connector, unit, or pin is sometimes split into multiple portions for convenience. In FIG. 5, a single connector C is split into connector C1 and connector C2 in the plan wiring diagram (A). Connectors C1 and C2, which actually are connector C as illustrated in the three-dimensional layout diagram. In this case, when the user selects connector C1 from the plan wiring diagram (A), both connectors C1 and C2 are highlighted and transitions from the plan wiring diagram (A) to the three-dimensional layout diagram (B) are displayed on the display device 30 using an animated display created by morphing technique described with reference to FIG. 3. Connectors C1 and C2 are displayed in the three-dimensional layout diagram (B) as connector C which is a single part.

According to a second aspect of the present invention, transitions from a three-dimensional layout diagram to a plan wiring diagram are displayed continuously. Returning to FIG. 1, when the user starts the program of the electronic manual (21) and selects, for example, the three-dimensional layout diagram 46 shown in FIG. 2 from the menu of the electronic manual (23), an appropriate underlying drawing is retrieved from the three-dimensional underlying-drawing data storage 11F. Three-dimensional layers of a plurality of appropriate wirings are retrieved from the three-dimensional layer data storage 11E, and the three-dimensional layout diagram 46 is displayed on the display device 30 as a superimposition of the underlying drawing and multiple three-dimensional layers (27). When the user selects wire A by placing the cursor on wire A in the three-dimensional layout diagram 46 and clicking the mouse or by entering the part number of wire A with an input device 40, the layer of wire A is superimposed over the underlying drawing of the general three-dimensional layout diagram. Wire A is highlighted by bold lines or by color.

Next, when the user pushs the Confirmation button displayed on the screen of the display device 30, for example, by clicking the button with a mouse, the underlying drawing of the plan wiring diagram including wire A is retrieved from the planar underlying-drawing data storage 11B, the layers of multiple wirings contained in the underlying drawing are retrieved from the planar layer data storage 11C, and a stack of the underlying drawing and the layers appears gradually on the display device 30 as the image 41 of the plan wiring diagram. Then, the intermediate images 7 of wire A in the three-dimensional layout diagram 46 are retrieved from the intermediate image data storage 11D to display transitions continuously until wire A takes the shape shown in the plan wiring diagram. Eventually, the layer of wire A is superimposed over the underlying drawing of the plan wiring diagram to complete the image 41.

Consequently, the image 41 of the plan wiring diagram is displayed on the display device 30 with wire A highlighted. In parallel with this operation, the image 46 of the three-dimensional layout diagram fades out as it is thinned gradually.

The speed of transition from image 46 to image 41 can be adjusted using the scroll bar 49 displayed on the screen of the display device 30.

Figure 4:
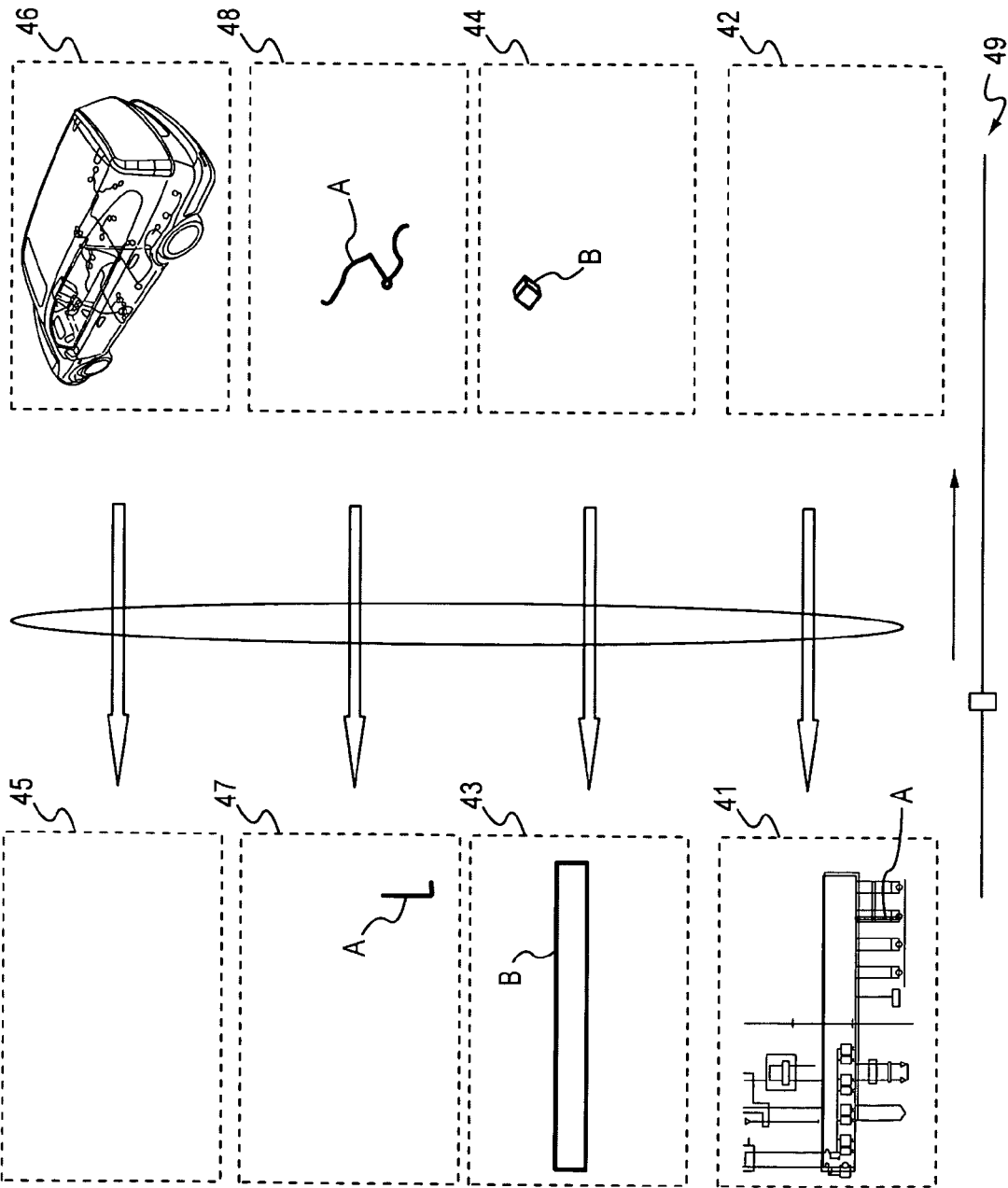
FIG. 4 is a stop-motion diagram showing a mechanism of transitions from a three-dimensional layout diagram to a plan wiring diagram.

FIG. 4 illustrates stop-motion view of such transition. The transition flow is opposite in direction to the one shown in FIG. 3. First, the three-dimensional layout diagram 46 selected from the menu by the user is displayed on the display device 30. The three-dimensional layout diagram 46 includes the underlying drawing retrieved from the three-dimensional underlying-drawing data storage 11F. Multiple layers illustrating the wirings and parts included in the structure of the underlying drawing are retrieved from the planar layer data storage 11C and superimposed.

When the user selects wire A from the three-dimensional layout diagram in the manner described above, the layer 48 of wire A is highlighted by bold lines or by color. Next, the intermediate images of the layer 48 are retrieved from the intermediate image data storage 11D to continuously display transition to a corresponding layer 47 in the three-dimensional layout diagram (33). Consequently, the shape of wire A in the layer 48 changes gradually to the shape of wire A in the layer 47 of the plan wiring diagram. Meanwhile, the layers in the underlying drawing of the three-dimensional layout diagram disappear gradually from the display screen, resulting in a blank image 45 (31). An underlying drawing of the plan wiring diagram including wire A is retrieved from the planar underlying-drawing data storage 11B and appears gradually on the display screen (35). At the same time, the layers of the other wirings and parts contained in the underlying drawing are retrieved from the planar layer data storage 11C and eventually superimposed over the underlying drawing. FIG. 4 illustrates a case in which wire A and part B that is connected to wire A are selected, as in the case of FIG. 3.

Figure 6:
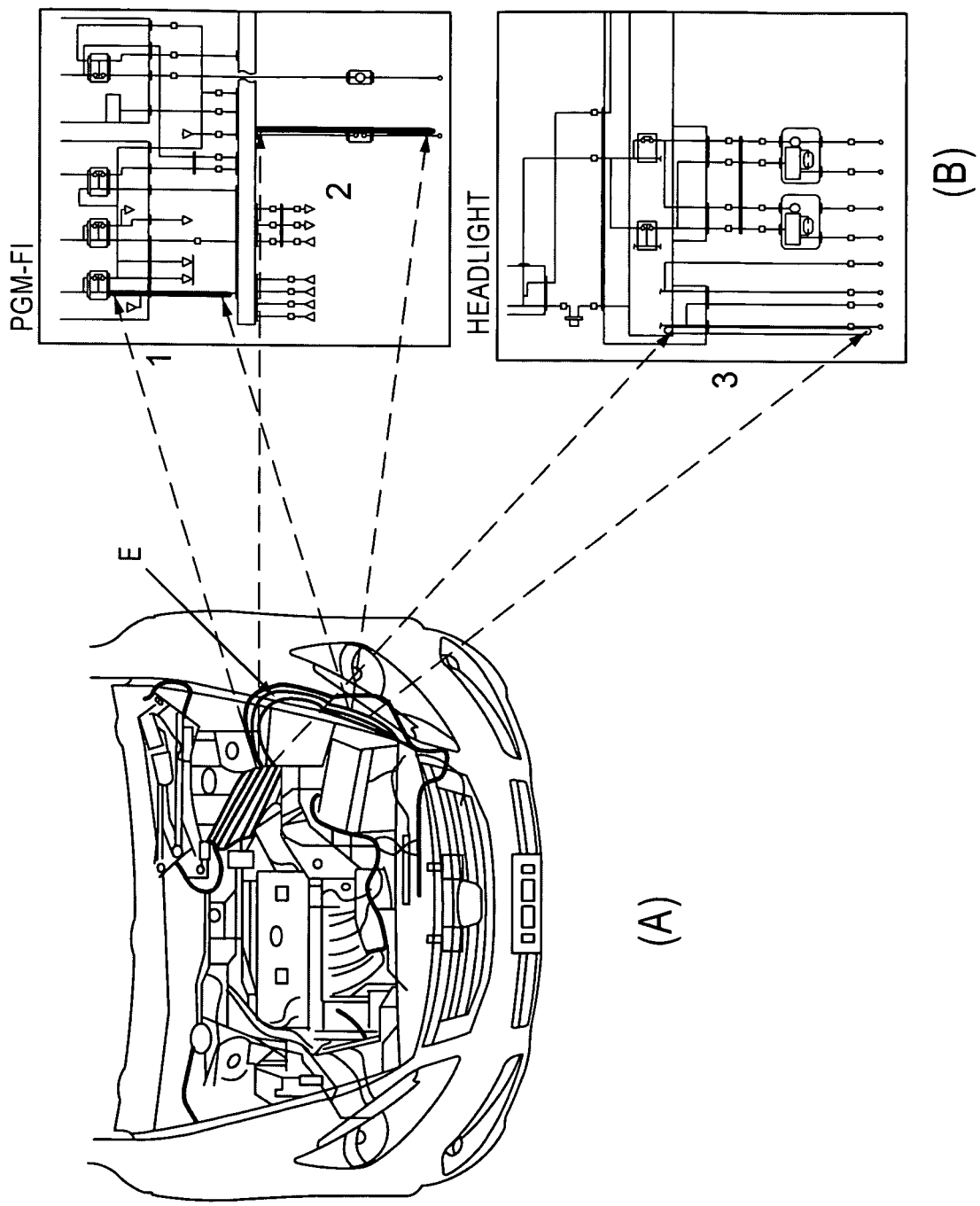
FIG. 6 is a diagram showing an example of correspondence between a three-dimensional layout diagram and plan wiring diagram of a harness containing multiple wires.

Referring now to FIG. 6, the user selects a three-dimensional layout view such as shown in FIG. 6(A), out of the electronic manual (25) for display on the display device 30. When the user places the cursor on a harness E, a bundle of wires, in the drawing and clicks the mouse (29), the processor 20 displays transition from the harness to the plan wiring diagram using intermediate images. In this case, each of multiple wires contained in the harness has its transition to a plan wiring diagram. In the example of FIG. 6(B), the plan wiring diagrams of wires 1, 2, and 3 are displayed on the display device.

In one example, when harness E is selected in FIG. 6(A), types of wires contained in the harness are presented in text form on the display to specify to which system the sires belong, for example, a fuel injection system, a headlight system, etc. Regarding the type of wiring selected by the user, transition to the plan wiring diagram are displayed. The other types of wiring, unless selected, do not have their transition to the plan wiring diagram displayed. Thus, a functional part which needs to be checked may be displayed on a single screen in an easy-to-view fashion, reducing the amount of data for intermediate images greatly. In this case, a combination of part numbers at each wiring connection in the plan wiring diagram is associated with the harness.

FIG. 7 shows a variation of the second aspect of the present invention. When the user places the cursor on wire F in the three-dimensional view as shown in FIG. 7(A) and clicks the mouse, the processor 20 rotates the three-dimensional view from (A) to (B), and then from (B) to (C). In FIG. 7(C) wire F appears in the front of the view. The processor 20 displays transition to a plan wiring diagram (D) which contains wire F beginning with the image in FIG. 7(C) and using intermediate images. As a plan wiring diagram is associated with the three-dimensional view, the amount of data needed to create the intermediate images may be greatly reduced.

Next, another embodiment of the present invention will be described. Referring to FIG. 2, when the user selects part B in the plan wiring diagram by placing the cursor on part B and clicking the mouse or by entering a part number of part B via the input device 40 (29), only the layer of part B is superimposed over the underlying layers of all the wirings and is highlighted by bold lines or by color. When the user pushed the confirmation button displayed on the screen of the display device 30, for example, by clicking the button with a mouse, part B changes its shape gradually to a three-dimensional shape via intermediate images 7. The three dimensional view is shown in block 46. The layer of part B is superimposed over an underlying layer of three-dimensional view retrieved from the three-dimensional underlying-drawing data storage 11F.

The speed of transition can be adjusted by sliding the button of the scroll bar 49.

FIG. 3 shows stop-motion transition. First, a plan wiring diagram 41 selected by the user is displayed on the display device 30. Layers of multiple wirings retrieved from the planar layer data storage 11C are superimposed over an underlying drawing retrieved from the planar underlying-drawing data storage 11B. When the user selects part B from the wiring diagram in the manner described above, the layer 43 of part B is displayed over an image 41 of the plan wiring diagram. Part B is highlighted by bold lines or by color. Next, the intermediate images of the layer 43 are retrieved from the intermediate image data storage 11D and transition to a corresponding layer 44 in the three-dimensional diagram is displayed (33).

In parallel, the underlying layer of the plan view disappears gradually from the display screen, resulting in a blank image 42 (31). At the same time, an image 46 appears gradually on the display screen with the layer 44 of part B superimposed over the underlying layer of the three-dimensional view of the automobile retrieved from the three-dimensional underlying-drawing data storage 11F (35). Multiple layers of three-dimensional view of the wirings contained in the underlying drawing are retrieved from the three-dimensional layer data storage 11E and are superimposed over the underlying layer resulting in the image 46 of the three-dimensional view in which part B is highlighted (35).

The layer of each part or wiring is linked to the underlying layer using a part number and is superimposed over the underlying layer to align with the underlying layer.

The intermediate images used here are generated using a morphing technique. The morphing technique generates moving-image data which represents smooth transition from a still image to another still image and is used in the field of animation. Morphing software products are commercially available. The morphing technique handles images in GIF, JPEG, TIFF, PNG, and other file formats.

In one example, part B and wire A connected to part B are selected. When part B and wire A are selected, the layer 47 of wire A connected to part B as well as the layer 43 of part B are highlighted. Intermediate images are produced by the morphing technique to show the manner wire A changes to a shape in a three-dimensional layer 48. The three-dimensional layer 48 of wire A is superimposed over the underlying layer of the three-dimensional view of the automobile to form the three-dimensional view 46. In this way, part B and wire A that is connected to part B are displayed together in the three-dimensional view.

According to one aspect of the present invention, transition from a part selected from a three-dimensional layout to a shape in a plan wiring diagram is sequentially displayed. Returning to FIG. 1, when the user starts the program of the electronic manual (21) and selects, for example, the three-dimensional layout 46 shown in FIG. 2 from the menu of the electronic manual (23), an appropriate underlying drawing is retrieved from the three-dimensional underlying-drawing data storage 11F. Three-dimensional layers of a plurality of appropriate parts and wirings are retrieved from the three-dimensional layer data storage 11E, and superimposed over the underlying layer to form the three-dimensional layout 46, which is displayed on the display device 30 (27). When the user selects part B by placing the cursor on part B in the three-dimensional layout diagram 46 and clicking the mouse or by entering the part number of part B via an input device 40, the layer of part B is superimposed over the underlying drawing of the entire plan wiring diagram. Part B is highlighted by bold lines or by color.

Next, when the user pushes the Confirmation button (not shown) displayed on the screen of the display device 30, for example, by clicking the button with a mouse, the underlying drawing of the plan wiring diagram including part B is retrieved from the planar underlying-drawing data storage 11B. The layers of multiple parts and wirings contained in the underlying drawing are retrieved from the planar layer data storage 11C and superimposed over the underlying drawing layer. The layers appear gradually on the display device 30 as the image 41 of the plan wiring diagram. The intermediate images 7 of part B layer in the three-dimensional layout diagram 46 are retrieved from the intermediate image data storage 11D to display transition of part B. Eventually, the layer of part B is superimposed over the underlying drawing of the plan wiring diagram to complete the image 41.

Consequently, the image 41 of the plan wiring diagram is displayed on the display device 30 with part B highlighted. The image 46 of the three-dimensional layout fades out by thinning.

The speed of transition from the image 46 to the image 41 can be adjusted by sliding the button of the scroll bar 49 displayed on the screen of the display device 30.

FIG. 4 shows display stop-motion transition. The transition flow is opposite in direction to the one shown in FIG. 3. First, the three-dimensional layout 46 selected from the menu by the user is displayed on the display device 30. The three-dimensional layout 46 includes the underlying drawing retrieved from the three-dimensional underlying-drawing data storage 11F. Multiple layers of the parts and wirings contained in the underlying drawing are retrieved from the layer storage 11C and superimposed over the underlying drawing.

When the user selects part B from the three-dimensional layout in the manner described above, the layer 44 of part B is highlighted by bold lines or by color. The intermediate images of the layer 44 are retrieved from the intermediate image data storage 11D to display transition to the corresponding layer 43 in the plan wiring layout (33). The shape of part B in the layer 44 changes gradually to the shape of part B in the layer 43 of the plan wiring view. Meanwhile, the layer in the underlying drawing of the three-dimensional layout disappears gradually from the display screen, resulting in a blank image 45 (31). The underlying drawing of the plan view including part B is retrieved from the planar underlying-drawing data storage 11B and appears gradually on the display screen (35). At the same time, the layers of the other wirings and parts contained in the underlying drawing are retrieved from the planar layer data storage 11C and superimposed over the underlying drawing.

Incidentally, FIG. 4 shows a case in which part B and wire A that is connected to part B are selected, as in the case of FIG. 3. In the example of FIG. 5, connector C is split into connector C1 and connector C2 in the plan wiring diagram (A). Connector C is displayed as a single part in the three-dimensional layout diagram (B). Conversely, connector C may be selected in the three-dimensional layout diagram (B) and displayed in the plan wiring diagram (A) as split into connectors C1 and C2.

The present invention has been described above by citing concrete examples, but it should be noted that the present invention is not limited to these concrete examples.

What is claimed is:

1. An apparatus for displaying a plan wiring diagram of parts and wirings in association with a three-dimensional layout of a device incorporating the parts and wirings, the apparatus comprising:
   a first storage for storing an underlying drawing of the plan wiring diagram which illustrates parts and wirings;
   a second storage for storing an underlying drawing of the three-dimensional layout of a device which incorporates the parts and the wirings;
   a third storage for storing intermediate images of the shapes of respective pieces of wirings in the plan wiring diagram with a starting image of each piece of wiring being a shape corresponding to the wiring in the plan wiring diagram and with an ending image of each piece of wiring being a shape corresponding to the wiring in the three-dimensional layout, said intermediate images showing transition of the shape of a corresponding piece of the wiring; and
   a processor adapted to display images on a display screen, the processor being configured to:
   display the plan wiring diagram in the form of said underlying drawing on the display screen by retrieving the plan wiring diagram from the first storage responsive to a user's selection,
   responsive to selection of a piece of wiring by a user from the displayed plan wiring diagram, sequentially retrieve intermediate images of the shape corresponding to the selected piece of wiring from the third storage to display transition of the shape of the piece of wiring until the shape transforms into the shape that may be superimposed to a layer of the underlying drawing of the three dimensional layout.

2. The apparatus for displaying wire according to claim 1, further comprising
   a fourth storage for storing positions and shapes of the parts in the plan wiring diagram in association with three-dimensional positions and shapes of the parts in the three-dimensional layout, wherein the processor displays the plan wiring diagram on the display device by retrieving the plan wiring diagram from the first storage based on a user's selection, and retrieves the three-dimensional position and shape of the part from the fourth storage when the part is selected from the plan wiring diagram and superimposes the part over the three-dimensional layout.

3. The apparatus for displaying wire according to claim 1, wherein the plan wiring diagram is formed of superimposition of a general underlying layer of the wirings and layers of respective wirings, and the intermediate images are provided for each layer.

4. The apparatus for displaying wire according to claim 3, wherein the intermediate images are generated by morphing.

5. The apparatus for displaying wiring according to claim 4, wherein while the intermediate images of the selected wiring are displayed, the processor erases the general underlying layer of the wirings and retrieves a general underlying layer of a corresponding three-dimensional layout for display on the display device.

6. A apparatus for displaying a plan wiring diagram of parts and wirings in association with three-dimensional layout of a device incorporating the parts and the wirings, the apparatus comprising:
   a first storage for storing an underlying drawing of the plan wiring diagram which illustrates parts and wirings;

a second storage for storing an underlying drawing of the three-dimensional layout of a device which incorporates the parts and the wirings;

a third storage for storing intermediate images of the shapes of respective pieces of wirings in the three-dimensional layout with a starting image of each piece of wiring being a shape corresponding to the wiring in the three-dimensional layout and with an ending image of each piece of wiring being a shape corresponding to the wiring in the plan wiring diagram, said intermediate images showing transition of the shape of a corresponding piece of the wiring; and a processor adapted to display images on a display screen, wherein the processor being configured to:

display the three-dimensional layout on the display screen in the form of said underlying drawing by retrieving the three-dimensional layout from the second storage responsive to a user's selection, responsive to selection of a piece of wiring by a user from the displayed three-dimensional layout, sequentially retrieve the intermediate images of the piece of wiring from the third storage, and display transition of the shape of the piece of wiring until the shape transforms into the shape that may be superimposed to a layer of the underlying drawing of the plan wiring diagram.

7. The apparatus for displaying wiring according to claim 6, further comprising a fourth storage for storing positions and shapes of the parts in the plan wiring diagram in association with three-dimensional positions and shapes of the parts in the three-dimensional layout diagram, wherein the processor displays the three-dimensional layout on the display device by retrieving the three-dimensional layout from the second storage based on a user's selection, retrieves the position and shape of the part in the plan wiring diagram from the fourth storage responsive to selection of the part from the three-dimensional layout, and displays the part at a corresponding position in the plan wiring diagram.

8. The apparatus for displaying wire according to claim 6, wherein the three-dimensional layout is formed of a superimposition of a general underlying layer of a three-dimensional layout and layers of individual wirings.

9. The apparatus for displaying wire according to claim 6, wherein the plan wiring diagram is formed of a superimposition of a general underlying layer of the wirings and layers of the respective wirings.

10. The apparatus for displaying wire according to claim 6, wherein while the intermediate images of the selected wiring are displayed, the processor erases the general underlying drawing of the three-dimensional layout and gradually displays a underlying drawing of a plan wiring diagram containing the corresponding wiring.

11. The apparatus for displaying wire according to claim 10, wherein the intermediate images represent transition of a plurality of wirings bundled in a harness in the three-dimensional layout to wirings in the plan wiring diagram.

12. The apparatus for displaying wiring according to claim 11, wherein when the plurality of wirings bundled into a harness corresponds to a plurality of drawings in the plan wiring diagram, the processor displays identification information about the plurality of drawings on the display device, and when one of the drawings is selected, the processor displays intermediate images to the selected drawing on the display device.

13. The apparatus for displaying wire According to claim 12, wherein the intermediate images are produced by morphing.

\* \* \* \* \*